(12) United States Patent
Wang et al.

(10) Patent No.: US 8,019,687 B2
(45) Date of Patent: Sep. 13, 2011

(54) DISTRIBUTED DIGITAL RIGHTS MANAGEMENT NODE MODULE AND METHODS FOR USE THEREWITH

(75) Inventors: Feng Chi Wang, Austin, TX (US); Philip Poulidis, Oakville (CA)

(73) Assignee: Morega Systems Inc., Ontario (CA)

( * ) Notice: Subject to any disclaimer, the term of this patent is extended or adjusted under 35 U.S.C. 154(b) by 78 days.

(21) Appl. No.: 12/264,218

(22) Filed: Nov. 3, 2008

(65) Prior Publication Data
US 2009/0063314 A1 Mar. 5, 2009

Related U.S. Application Data

(62) Division of application No. 11/821,544, filed on Jun. 22, 2007, now abandoned.

(51) Int. Cl.
*G06F 21/00* (2006.01)
*G06F 15/16* (2006.01)

(52) U.S. Cl. ............... 705/51; 705/52; 705/57; 709/203

(58) Field of Classification Search ............ 705/52, 705/51, 57; 709/203
See application file for complete search history.

(56) References Cited

U.S. PATENT DOCUMENTS

| | | | | | |
|---|---|---|---|---|---|
| 4,713,761 | A | * | 12/1987 | Sharpe et al. | 705/30 |
| 4,750,119 | A | * | 6/1988 | Cohen et al. | 705/14.34 |
| 4,799,156 | A | * | 1/1989 | Shavit et al. | 705/26 |
| 5,220,501 | A | * | 6/1993 | Lawlor et al. | 705/40 |
| 5,222,018 | A | * | 6/1993 | Sharpe et al. | 705/30 |
| 5,426,281 | A | * | 6/1995 | Abecassis | 235/379 |
| 5,799,286 | A | * | 8/1998 | Morgan et al. | 705/30 |
| 5,825,751 | A | * | 10/1998 | Papierniak et al. | 370/248 |
| 5,893,080 | A | * | 4/1999 | McGurl et al. | 705/40 |
| 5,920,847 | A | * | 7/1999 | Kolling et al. | 705/40 |
| 5,982,891 | A | * | 11/1999 | Ginter et al. | 705/54 |
| 6,128,602 | A | * | 10/2000 | Northington et al. | 705/35 |
| 6,167,378 | A | * | 12/2000 | Webber, Jr. | 705/8 |
| 6,223,168 | B1 | * | 4/2001 | McGurl et al. | 705/40 |
| 6,654,805 | B1 | * | 11/2003 | Aldred et al. | 709/224 |
| 6,993,508 | B1 | * | 1/2006 | Major et al. | 705/51 |
| 7,143,109 | B2 | * | 11/2006 | Nagral et al. | 1/1 |
| 7,721,195 | B2 | * | 5/2010 | Jiang et al. | 715/235 |
| 2002/0072956 | A1 | * | 6/2002 | Willems et al. | 705/10 |
| 2002/0091642 | A1 | * | 7/2002 | Rahnasto | 705/52 |
| 2002/0143858 | A1 | * | 10/2002 | Teague et al. | 709/203 |
| 2002/0161680 | A1 | * | 10/2002 | Tarnoff | 705/35 |
| 2002/0184527 | A1 | * | 12/2002 | Chun et al. | 713/201 |
| 2003/0078891 | A1 | * | 4/2003 | Capitant | 705/57 |
| 2003/0233292 | A1 | * | 12/2003 | Richey et al. | 705/28 |
| 2003/0233321 | A1 | * | 12/2003 | Scolini et al. | 705/40 |
| 2005/0246282 | A1 | * | 11/2005 | Naslund et al. | 705/52 |
| 2006/0004745 | A1 | * | 1/2006 | Kuhn et al. | 707/4 |
| 2006/0048096 | A1 | * | 3/2006 | Jiang et al. | 717/115 |
| 2007/0239660 | A1 | * | 10/2007 | Tien et al. | 707/2 |
| 2008/0098212 | A1 | * | 4/2008 | Helms et al. | 713/155 |

* cited by examiner

*Primary Examiner* — Evens J Augustin
*Assistant Examiner* — Nancy Loan Le
(74) *Attorney, Agent, or Firm* — Garlick Harrison & Markison; Bruce E. Stuckman

(57) ABSTRACT

A digital rights management (DRM) node module for use in a node of a public data includes a node data module that stores DRM data associated with a plurality of digital files, the DRM data including a plurality of DRM identifiers. A packet monitoring module receives the plurality of DRM identifiers from the node data module, that receives packets containing incoming content and compares the incoming content to the DRM identifier, and generates event data when the incoming content matches at least one of the DRM identifiers. A node reporting module receives the event data, and generates node report data based on the event data.

12 Claims, 9 Drawing Sheets

Upload of Protected Data

Type of data: JPEG image file
Protection: Digital watermark
Protection data: 12B73460C4F2364BB270011
Potection key: MoregaAOK27
Track: Yes
Bill: Yes
Bill rate: $0.99
Prohibit non-billable transfers w/o key: Yes

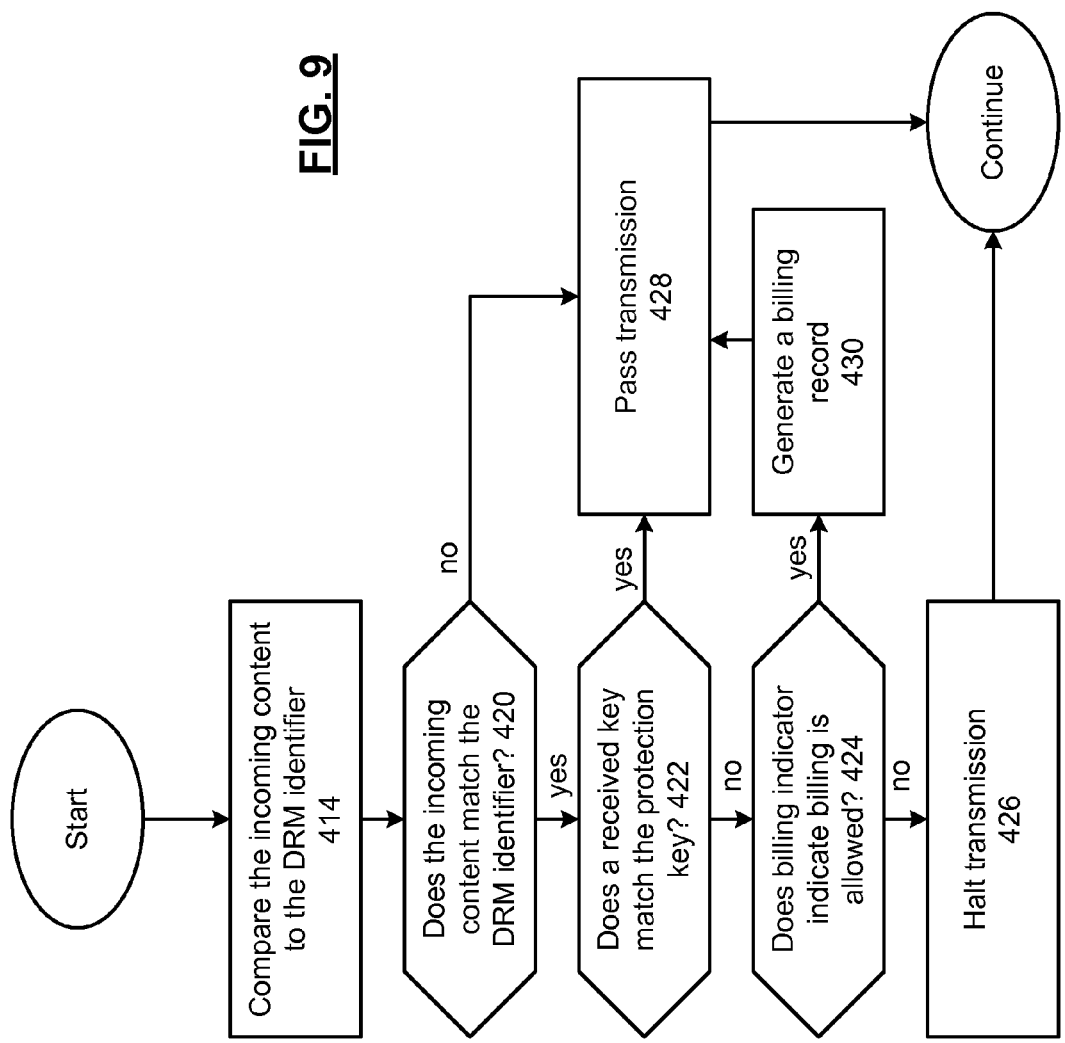

DISTRIBUTED DIGITAL RIGHTS MANAGEMENT NODE MODULE AND METHODS FOR USE THEREWITH

CROSS REFERENCE TO RELATED APPLICATIONS

The present application claims priority under 35 USC 120 as a divisional of the copending application, DISTRIBUTED DIGITAL RIGHTS MANAGEMENT SYSTEM AND METHODS FOR USE THEREWITH, having Ser. No. 11/821,544, filed on Jun. 22, 2007.

TECHNICAL FIELD OF THE INVENTION

The present invention relates to transfer of media content and related methods used in data networks.

DESCRIPTION OF RELATED ART

Certain media content, such as movies, songs, and music albums can be protected by digital rights management techniques that are meant to restrict unlicensed copying of copyrighted materials. For instance, music compact disks (CDs), video cassettes and digital video disks (DVDs) are recorded with copy protection signals that are meant to prevent the media content contained on these media from being copied. Image files can by encoded with digital watermarks or other digital signatures that, when found in an unauthorized copy of a copyrighted work, can be used to indicate the origin of the image.

In spite of the existence of these protections, some users defeat these mechanisms by digitally encoding the media content as a digital file. Other media content is not the subject of such protections and again can be subjected to digital encoding or other transmission as a digital. Widespread sharing of copyrighted media content over the World Wide Web has been a problem that has been only partially addressed by increased legal action by content holders.

BRIEF DESCRIPTION OF THE SEVERAL VIEWS OF THE DRAWINGS

FIG. 6 presents a pictorial representation of a screen display 250 in accordance with an embodiment of the present invention.

FIG. 9 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
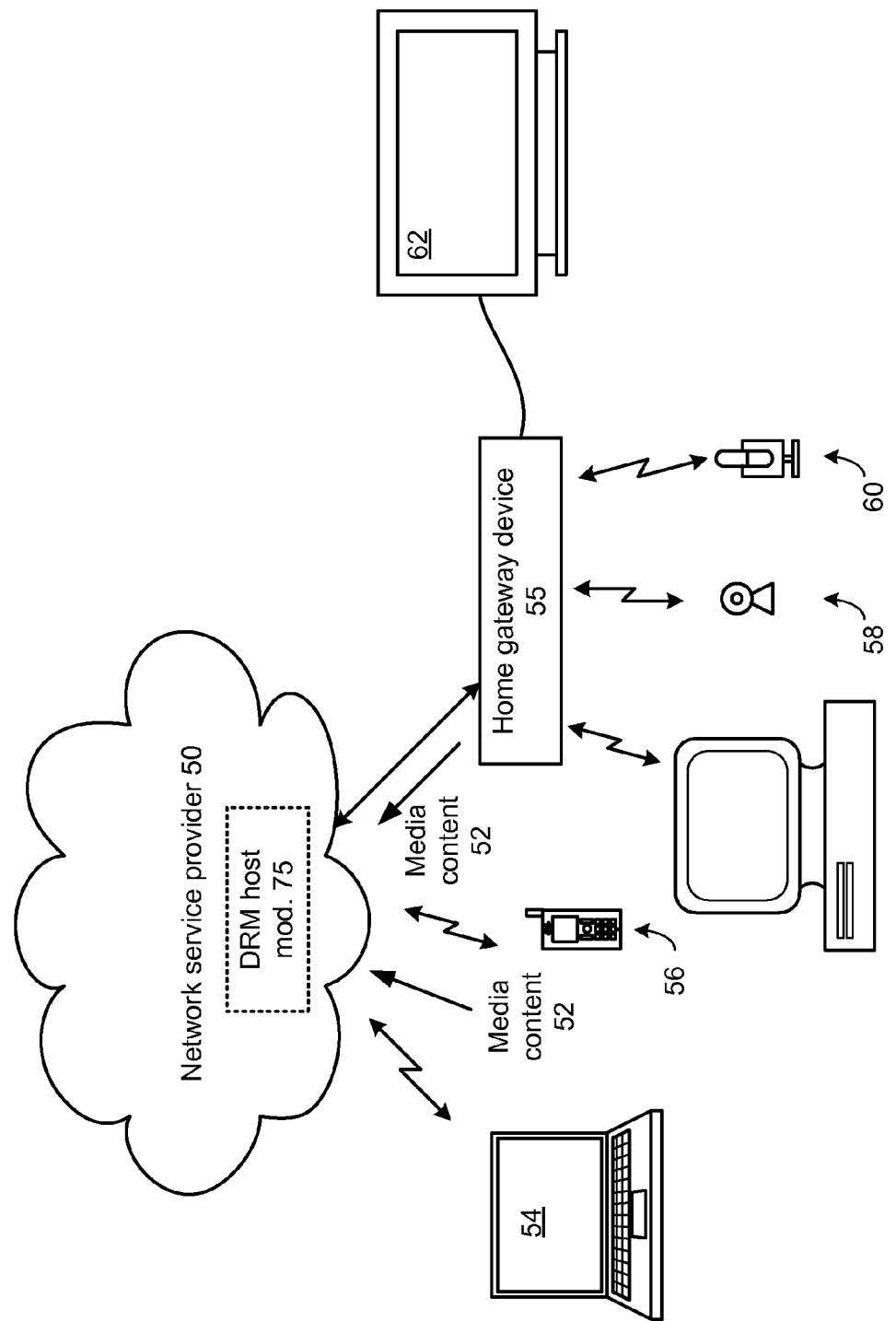
FIG. 1 presents a block diagram representation of a media distribution system that includes a home gateway device 55 in accordance with an embodiment of the present invention.

FIG. 1 presents a block diagram representation of a media distribution system that includes a home gateway device 55 coupled to a network service provider 50 in accordance with an embodiment of the present invention. In particular, the network service provider 50 can be an Internet service provider that provides Internet access via a narrowband, broadband or other connection, a cable television network or broadcast satellite network that also provides Internet access via a narrowband, broadband or other connection, a data network associated with a public switched telephone network that provides internet access via dial-up, digital subscriber line or other data service, or a wireless telephone network that provides associated data network services and/or internet access via a high speed wireless connection, or other data network, either wired or wireless. Home gateway device 55, can be a multimedia server, set-top box, wireless local area network (WLAN) access point, television receiver, cable television receiver, satellite broadcast receiver, broadband modem, 3G transceiver or other media gateway or transceiver that is capable of sending media content to network service provider network 50.

The media content 52 can be in the form of one or more video signals, audio signals, multimedia signals or other media signals that are either realtime signals in analog or digital format or data files that contain media content 52 in a digital format. For instance, media content 52 can be included in a video signal, such as a television signal, high definition televisions signal, enhanced high definition television signal or other video signal that has been transmitted over a wireless medium, either directly or through one or more satellites or other relay stations or through a cable network, optical network or other transmission network. Further, media content 52 can be included in a digital audio or video file, transferred from a storage medium such as a server memory, magnetic tape, magnetic disk or optical disk, or can be included in a streaming audio or video signal that is transmitted over a public or private network such as a wireless or wired data network, local area network, wide area network, metropolitan area network or the Internet.

Home media gateway device 55 is coupled to optionally receive additional media content from the network service provider 10 and to play audio and video portions of the additional media content 52 on display device 62. Display device 62 can include a television, monitor, computer, handheld device or other video display device that creates an optical image stream either directly or indirectly, such as by optical transmission or projection, and/or that produces an audio output from media content 52. In addition, home gateway device 55 is coupleable to additional external devices such as portable computer 54, wireless telephony device 56, video camera 58 and microphone 60 to upload and download media content, such as media content 52 to these devices in accordance with the present invention.

In an embodiment of the present invention, home gateway device 55 includes a wired link for coupling to external device 54, 56, 58, 60, etc. to transfer audio or video data. The coupling can include a serial or parallel connection such as a, Ethernet connection, Universal Serial Bus (USB) connection, an Institute of Electrical and Electronics Engineers (IEEE) 1394 (Firewire) connection, small computer serial interface (SCSI) connection or other wired connection that operates in accordance with either a standard or custom interface protocol. In this fashion, external devices such as desktop or portable computer 54, or wireless telephony device 56, or other external devices can be coupled to the home gateway device 55 to send and receive compressed digital audio and/or video files from the home gateway device 55 through a synchronization or "sync" operation, or by command from one or the other of these devices. In addition, audio and video data can be received from microphone 60 and video camera 58.

In another embodiment of the present invention, the home gateway device 55 includes a wireless link for coupling to one or more of the external devices 54, 56, 58, 60, etc. that operates in accordance with a wireless network protocol such as 802.11a,b,g,n (referred to generically as 802.11x), Bluetooth, Ultra Wideband (UWB) or other wireless connection that operates in accordance with either a standard or custom interface protocol in order to transfer media content, such as media content 52 to or from one or more of these external devices and the home gateway device 55.

In a further embodiment, the home gateway device 55 includes a removable memory, such as a removable drive, disk or memory card. In this fashion, the removable memory can be written with a compressed digital audio or video file that contents the media content 52 when inserted in the home gateway device 55 and read when inserted in one or more external devices and vice versa.

In operation, the home gateway device 55 receives media content 52 from one or more of the external devices 54, 56, 58 and/or 60. This media content 52 can be transferred through network service provider 50 for use and sharing by others as allowed by the creator of the media content 52. In addition, information regarding the media content 52 is registered with digital rights management (DRM) host module 75 as part of a distributed DRM system that can track transfers of the media content 52, determine if transfers are authorized or not authorized, stop unauthorized transfers and/or bill users for unauthorized transfers of the media content 52.

It should be noted that the present invention can operate with other devices coupled to DRM host module 75. As shown, portable computer 54 and wireless telephony device 56 are examples of devices that can access DRM host module 75 via wireless and or wired connections either directly or via the Internet or other data network path to the transfer media content 52 through network service provider 50 for use and sharing by others as allowed by the creator of the media content 52, with the distributed digital rights management as described above.

Further details regarding the present invention including alternative embodiments, optional implementations, functions and features are presented in conjunction with FIGS. 2-9 that follow.

Figure 2:
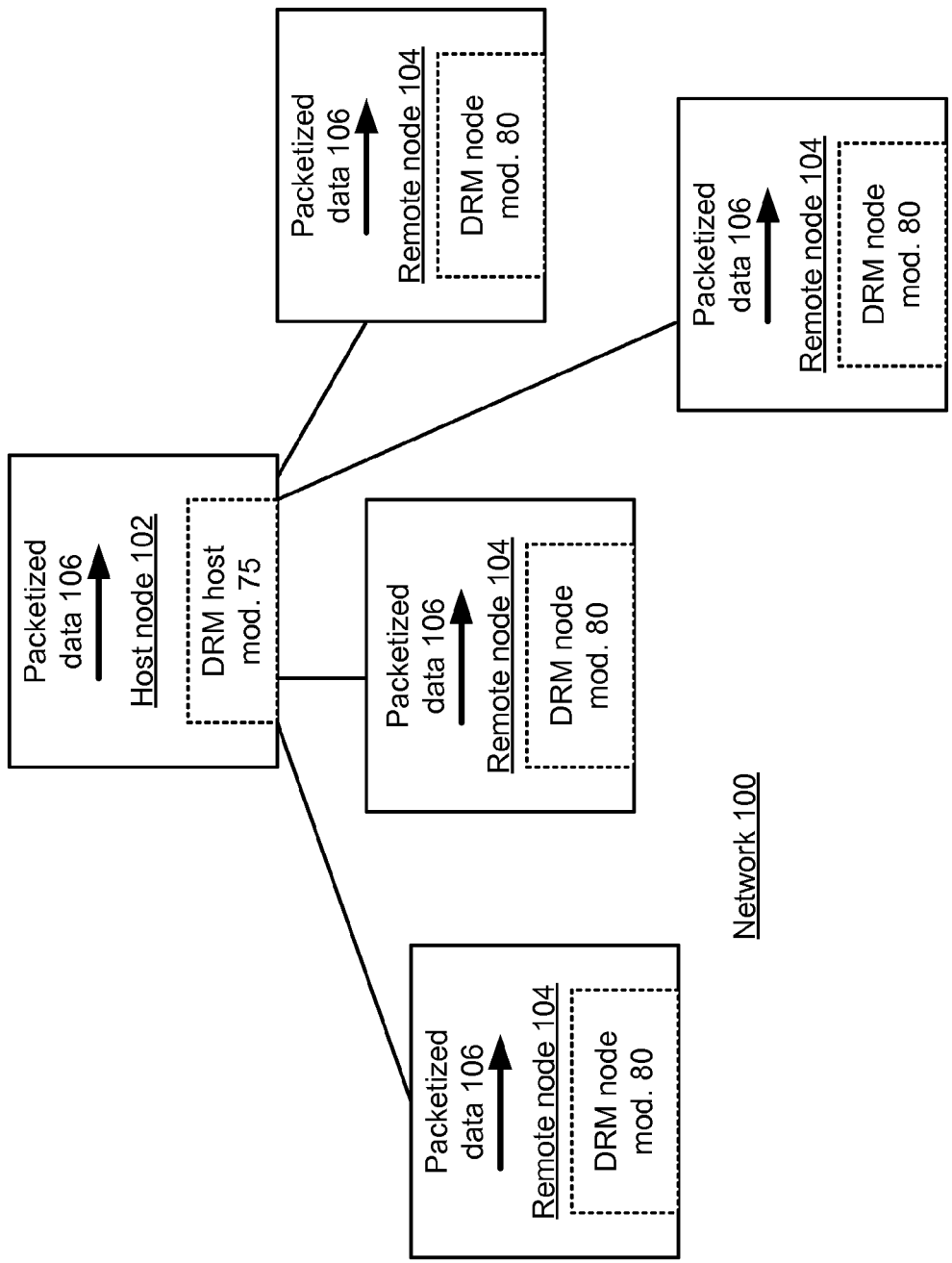
FIG. 2 presents a block diagram representation of a network 100 in accordance with an embodiment of the present invention.

FIG. 2 presents a block diagram representation of a network 100 in accordance with an embodiment of the present invention. In particular, network 100 includes host node 102 that includes DRM host module 75 and a plurality of remote nodes 104 that each include a DRM node module 80 that cooperate to implement a distributed digital rights management system. In an embodiment of the present invention, the hosted node 102 and the remote nodes 104 can include a server, router, switch, gateway, internetworking unit, or other device that passes packetized data traffic 106 through a public data network such as the Internet or a private data network. It should be noted that network 100 can include additional network nodes that are coupled together with host node 102 and the remote nodes 104 via additional connections (not shown) in one or more ring configurations, star configurations or other network configurations. It should also be noted that the connections shown between host node 102 and remote nodes 104 may or may not be direct connections, and in particular may include a virtual connection using one or more additional nodes of the network 100 that are not shown.

In an embodiment of the present invention, DRM node modules 80 monitor packetized data 106 that passes through their respective remote nodes 104 to detect the passage of media content 52 that is protected by the distributed digital rights management system. When media content 52 is detected by a DRM node module 80 and transfer of media content is not authorized, DRM node module 80 can act to stop the transfer of the media content 52 at that particular node, or to optionally allow the transfer while billing either the sending or receiving party to the transfer. In a further mode of operation, each remote node 104 can generate node report data 116 and transfer this node report data to DRM host module 75 for generating reports relating to the detection of media content transfers.

Figure 3:
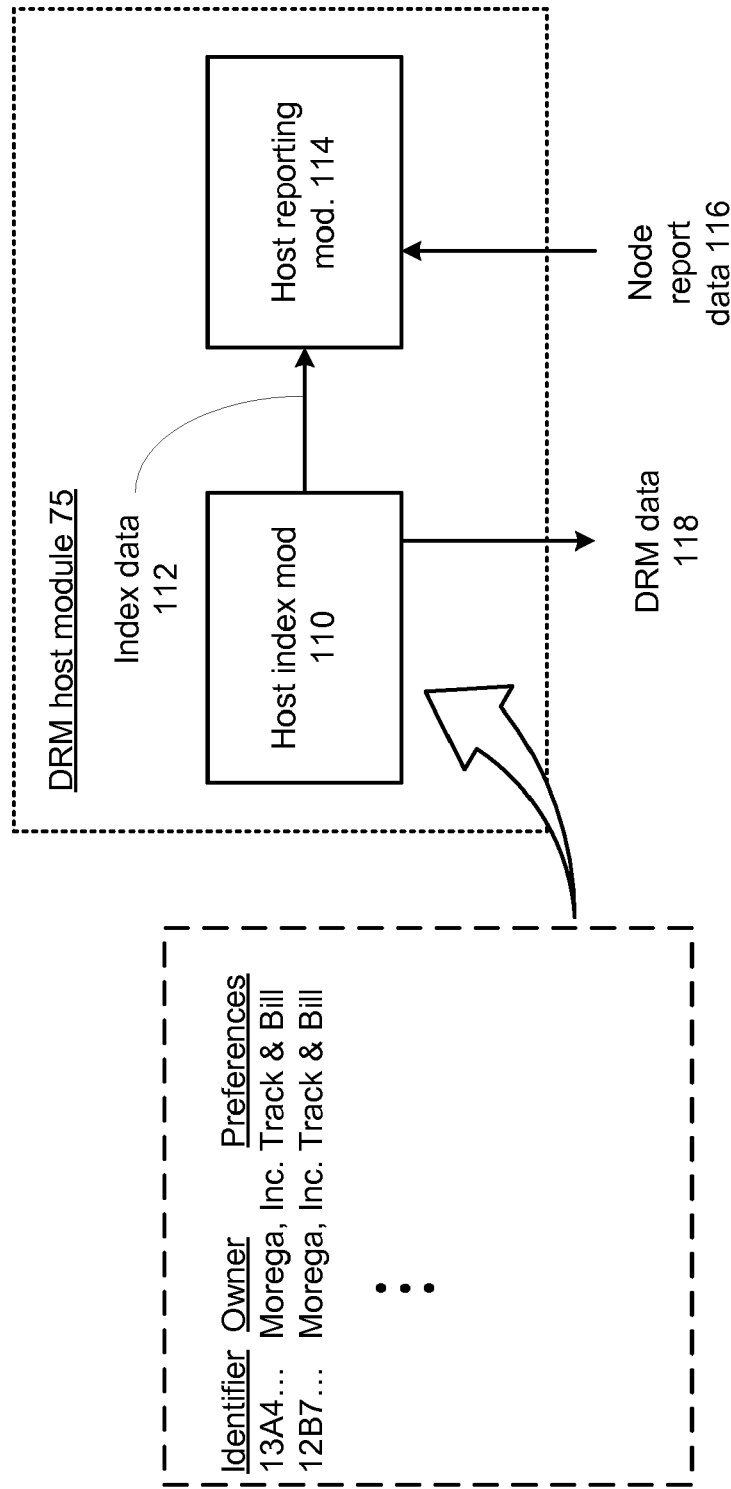
FIG. 3 presents a block diagram representation of a digital rights management host module 75 in accordance with an embodiment of the present invention.

FIG. 3 presents a block diagram representation of a digital rights management host module 75 in accordance with an embodiment of the present invention. In particular, DRM host module 75 includes a host index module 110 that stores a plurality of index data pertaining to a plurality of digital files containing media content, such as media content 52, and DRM data 118 associated therewith.

As shown, the DRM data can include a DRM identifier such as a signature, meta-tag, digital watermark or other identifier that is included in the digital file, such as via steganography or other encoding method or that otherwise identifies the digital file. In addition, the index data can include information pertaining to the owner such as a subscriber ID, set-top box ID or other information, preferences such as whether media content should be tracked with reports generated, whether the passage of media content should be stopped if detected, whether senders or recipients are to be billed for transferring the media content in an unauthorized fashion and at what rate, as well as additional index data such as the type/format of the digital file, a protection key, such as a password, encryption key of other means to determine if transfer of the media content has been authorized, account numbers or other information of the owner and other data and preferences relating to the digital file. In particular DRM data 118 can be supplemented with information on known pirating websites and, in general, includes the data necessary for implementation of the monitoring and node report data generation in accordance with the particular features of the present invention that are being implemented by DRM node module 80.

In addition, DRM host module 75 includes a host reporting module 114 that receives node report data 116 from a plurality of nodes in the public data network, and that generates at least one DRM report based on the node report data. In a mode of operation the DRM report includes event data included in the node report data 116 pertaining to instances where one or more of the digital files from the index was received at one or more of remote nodes 104, such as time, date, node identifier, which digital file, number of occurrences, whether the transfer was stopped, billing data indicating amounts billed for passage of one or more of the digital files through one or more of remote nodes 104, and/or other report data. As shown, host reporting module 114 is coupled to host index module 110 for optionally retrieving billing information, mailing information, or other portions of index data 112 to include in the reports that are generated.

Examples of the operation of the digital rights management system can be illustrated by means of the following scenarios.

In a first scenario a user, via a home gateway device 55, such as a set-top box coupled to a cable network, uploads a photo she has composed to her personal homepage that is hosted by servers of the cable network. Through software provided by the cable company, the user includes a digital watermark in the photo that is stored on the webpage. The user registers the photo with the digital rights management system that interactively collects the index data and subscribes to the distributed DRM service for a monthly fee. The index data is stored in the host index module 110.

The user does not wish copies of the photo to be shared and, as part of the registration process, the user chooses to prohibit transfers of the photo. If someone attempts to transfer the photo through any of the remote nodes 104, such as in an email attachment, multimedia message or other digital file transfer, the remote node 104 can detect the digital watermark in the packetized data that passes through the node, and either erase the digital file that contains the digital watermark or otherwise stop the transfer of the digital file that contains the photo. As part of the subscription fee, the user can receive a report that contains event data that indicates occurrences (or lack thereof) of attempted transfers of the photo. Where the user has registered more than one photo that is registered with the distributed DRM system, the report can be broken up into subsections to give individual results for each such photo.

In a second scenario, a user uploads a performance of a song that he has composed to a popular MyTunes website that distributes digitally formatted audio files of the performance for a fee (in this case $0.99), a portion of which is paid to the user. The audio file is provided by MyTunes with a digital watermark and with copy protection that appends a protection key to the digitally formatted audio file that can be decrypted to determine if a copy or transfer of the file has been authorized. The user registers this work with the distributed DRM system and provides information on the watermark and the protection key encryption that is included in the DRM data 118, and elects to allow transfer of the audio file if billing can be collected of $0.99.

When a remote node 104 detects a transfer of the digital audio file that contains the song, it first checks the appended protection key to determine that the transfer has been allowed. If not, the remote node 104 can try to determine the sender and/or the recipient to determine if either can be billed for the transfer (such as when the digital audio file is sent via email or other multimedia message and the sending or receiving address of the message corresponds to a subscriber to the network 100 that is under common control with the distributed DRM system and where a billing arrangement is already in place). If so, the node report data 116 can include billing data to bill the fee for the transfer of the digital audio file to the sender, for instance, with a portion being credited to an account of the user that composed the song. In the case, the report to the user can include information on amounts billed and credited to his account.

The scenarios above are merely examples of several of the many variations including many optional functions and features of the present invention.

In an embodiment of the present invention the host index module 110 and host reporting module 114 are implemented as operational instructions stored in a memory and run on a shared or dedicated processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on such operational instructions. Such a memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 4:
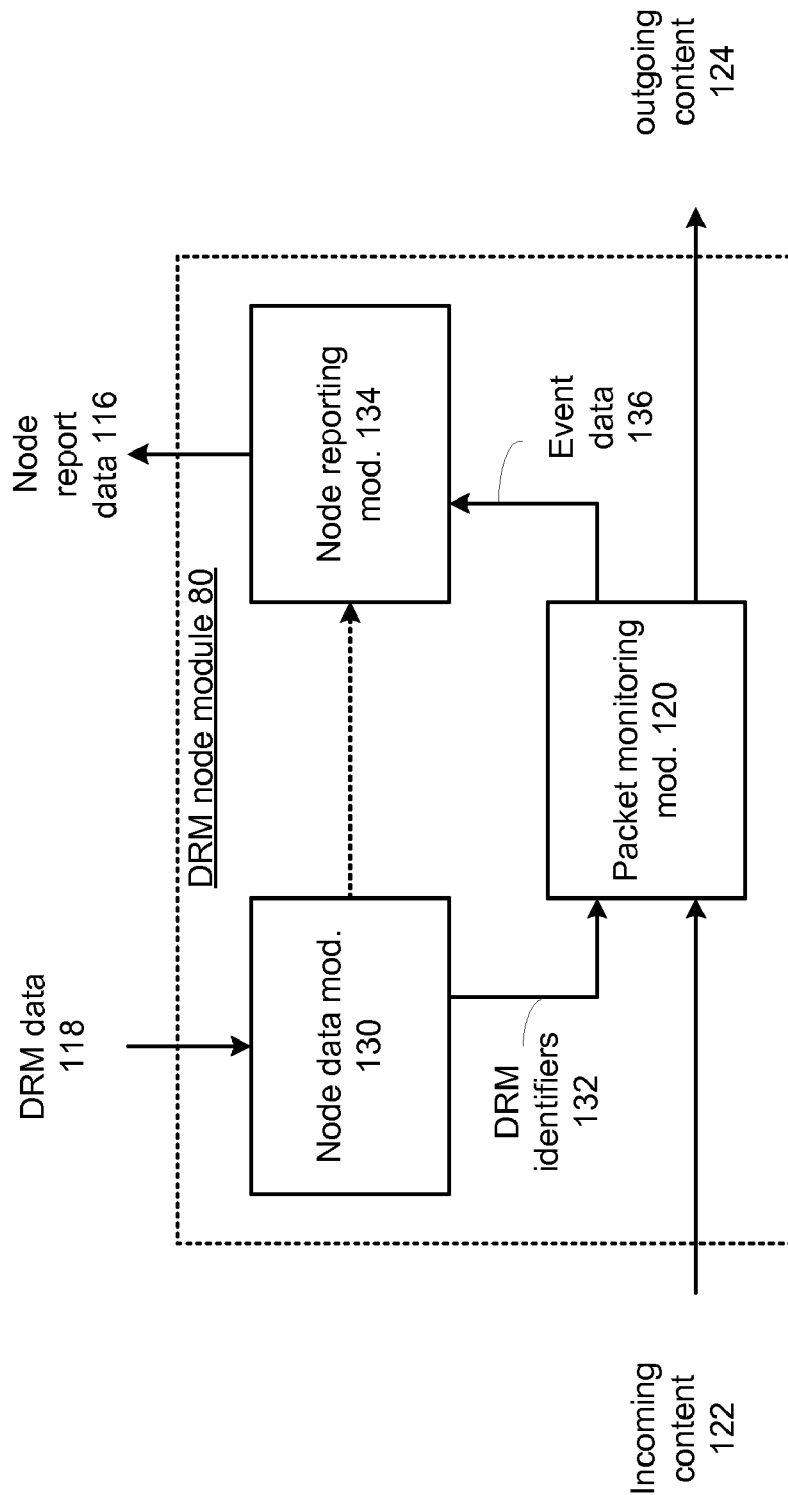
FIG. 4 presents a block diagram representation of a digital rights management node module 80 in accordance with an embodiment of the present invention.

FIG. 4 presents a block diagram representation of a digital rights management node module 80 in accordance with an embodiment of the present invention. In particular, DRM node module 80 includes a node data module 130 that stores DRM data 118 associated with a plurality of digital files, the DRM data 118 including a plurality of DRM identifiers. Packet monitoring module 120 receives the plurality of DRM identifiers 132 from the node data module 118, receives packets of incoming content 122, compares the incoming content 122 to the DRM identifier 132, and generates event data 136 when the incoming content 122 matches at least one of the DRM identifiers 132. In an embodiment of the present invention, packet monitoring module 120 performs deep packet monitoring to analyze the data payload of the incoming content 122 to determine if a digital file exhibits one of the DRM identifiers 132, such as a digital watermark, meta-tag or other digital identifier or signature, that includes an IP address such as an IP address associated with a source known for pirating, and/or that analyzes payload content to determine a match with other DRM identifiers 132 such as by searching for patterns at select points in time (and space in the case of video frames or fields) via pattern recognition, fuzzy logic, statistical correlation or other matching technique.

Node reporting module 134 receives the event data 136, and generates node report data 116 based on the event data 136 for transmission to the DRM host module 75. The event data 136 can include a originator of the incoming content and a destination of the incoming content, such as a sender and recipient of an email message, multimedia message or other data transfer and other event data such as billing information, time and date of events, types of events and dispositions, the particular DRM identifiers 132 matched, etc. In an embodiment of the present invention, the packet monitoring module 120 halts transmission of the incoming content 122 when the incoming content 122 matches the at least one of the DRM identifiers 132, by erasing or otherwise stopping the media content from being included in outgoing content 124. As discussed, DRM data 118 can include a protection key associated with the at least one of the plurality of DRM identifiers 132, and wherein the packet monitoring module 120 can pass transmission of the incoming content 122 as outgoing content 124 when the incoming content matches at least one of the DRM identifiers, but also the protection key matches a received key from the incoming content 122 that has been appended or otherwise included in association with the digital file that stores the media content, such as media content 52.

In an embodiment, the DRM data 118 includes a billing indicator associated with the at least one of the plurality of DRM identifiers 132, and wherein the packet monitoring module 120 passes transmission of the incoming content 122 when the incoming content matches at least one of the DRM identifiers 132, and the billing indicator indicates that billing is allowed and when proper billing information can be gathered from the incoming content 122, and correlated to billing information that is included as part of the index data 112. In a mode of operation, DRM data 118 includes a list of available billing entities where billing information is on file and this information is provided to packet monitoring module 120 to determine if sender information gathered from incoming content 122 matches any of these billing entities so that proper billing information can be determined.

In an embodiment of the present invention the node data module 130, packet monitoring module 120 and node reporting module 134 are implemented as operational instructions stored in a memory and run on a shared or dedicated processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on such operational instructions. Such a memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 5:
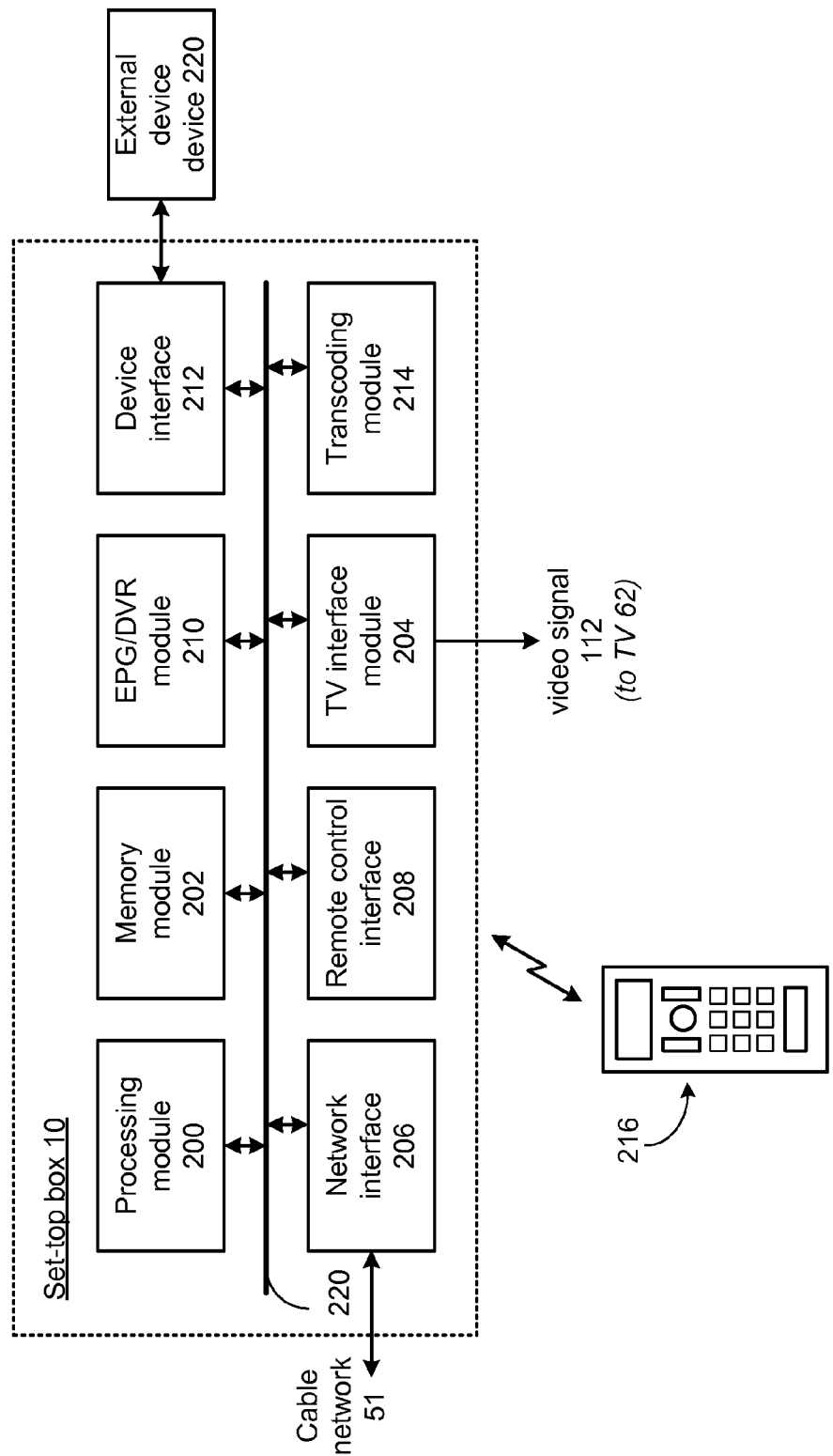
FIG. 5 presents a block diagram representation of a set-top-box 10 in accordance with an embodiment of the present invention.

FIG. 5 presents a block diagram representation a set-top box 10 in accordance with an embodiment of the present invention. In this embodiment, set-top box 10 is a particular embodiment of home gate way device 55 that operates in conjunction with network service provider 50 that is, in this case, a cable network provider. In this embodiment, set-top box 10 operates to register media content 52 of the subscriber with the DRM host module 75 and optionally to further provide media content 52 for distribution as authorized, such as through an application hosted or otherwise offered by network service provider 50. As such, the set top box 10 includes one or more of the functions and features associated with home gateway 55 including the various optional couplings to the external devices 54, 56, 58 and/or 60.

Set-top box 10 can receive user commands and other user initiated signaling via remote control device 216 that communicates with the set top box via infrared or other wireless signaling. In an embodiment of the present invention, set-top box includes a graphical user interface that operates in conjunction with display device 62 and remote control device 216 to provide set-up of services through the distributed DRM system, register media content 52, to receive other user commands and selections in conjunction with the standard set top box functionality and to provide the selections, commands and other data inputs that are specific to the one or more features of the present invention. Examples of such features are presented in conjunction with FIG. 6 that follows.

Set-top box 10 receives a video signal 110 and produces a processed video signal 112 for display on video display device 62 as either the playback of a compressed digital video file or a buffered live (realtime or near realtime) video signal that is produced in a format that corresponds to the format of video display device 62. In general, video signal 110 can include an analog video signal that is formatted in any of a number of video formats including National Television Systems Committee (NTSC), Phase Alternating Line (PAL) or Sequentiel Couleur Avec Memoire (SECAM). Further, such signals can be in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In an embodiment of the present invention, the connection between network service provider 50 and set-top box 10 includes a Data Over Cable Service Interface Specification (DOCSIS) link that allows data, including media content 52 to be transferred by set-top box 10 and that allows the user of set-top box 10 to transmit index data to the DRM host module 75 in order to establish distributed DRM service through the network service provider 50 and to set-up preferences, etc.

Set-top box 10 includes a device interface 212 for coupling to at least one external device 220, such as external devices 54, 56, 58, 60 or other external devices, a network interface 206 for coupling to cable network 51, a television interface for coupling to a television including a television monitor, a remote control interface 208 that receives user initiated signaling from a remote control device 216, a processor 200 that operates in accordance with a open cable application platform or other operating system layer that runs an application that allows a user to establish a distributed DRM service, create index data and send the index data to the DRM host module 75. In addition, set-top box 10 include a data bus 220, memory module 202, electronic program guide (EPG)/digital video recorder (DVR) module 210, and transcoding module 214.

Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

The other modules of set-top box 10 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture.

Memory module 202 can store the application, user selections, preferences and other data, the operating system, other software and firmware, and additionally, can store a plurality of compressed video files corresponding to instances of media content 52. As discussed above, memory module can include a plurality of different memory devices. In an embodiment of the present invention, the plurality of compressed video files are stored in a large capacity storage medium such as a hard disk drive or flash memory, however other memory devices may likewise be used, and in particular, a removable memory device can be used to store the compressed video files in instances where the media content 52 is transferred to one or more external devices via such a removable memory.

In operation, transcoding module 214 can encode video signal 110 or into a digital file format for storage in memory module 202 and/or to convert the particular digital video format used by one or more of the external devices 54, 56, 58, and 60 that have been selected by the user for storage, playback by display device 62 or for transmission to network service provider 50. This encoding can include transcoding, transrating and other conversion from a one media format to one or more additional media formats. As previously discussed, these additional media formats can include respective copy protection or other digital rights mechanisms to allow the media content 52 to be transferred to or used only as allowed by the digital rights that have been obtained and not in other ways. Depending on the type of copy protection and the particular media formats, the copy protection can be removed for encoding or transcoding and reapplied in the newly encoded or transcoded format.

EPG/DVR module 210 includes an electronic program guide that allows a user, through operation of user interface module 212 and one or more user interface devices 214 to obtain information regarding current or upcoming programs that can be viewed, downloaded or recorded. In an embodiment of the present invention, EPG/DVR module 210 includes digital video recorder functionality that operates in conjunction with memory module 202 to record, store, select, and playback media content 52. In operation of EPG 210, a user can establish playback and record settings and preferences, interactively choose programs to record, select stored programs for playback, to pause, fast forward and rewind playback of compressed video files and buffered live video streams used to generate the processed video signal 112.

In an embodiment of the present invention, display device 62 includes a display, such as a separate liquid crystal, plasma or other display device capable of displaying text and/or graphics. The application, the electronic program guide and the digital video recorder can generate overlay text, and graphics such as one or more menus to implement a menu driven graphical user interface that is presented on processed video signal 112 for display on display device 62. Through operation of the remote control device 216 or other pointing, indication or other user interface device, the user can select different choices or preferences, browse and select from a plurality of menus and/or otherwise interact with the application and the electronic program guide and digital video recorder in order to control the operation of the set-top box 10.

While TV interface module 204 has been described in terms of being coupled to a single display device 62, TV interface module 204 can likewise include multiple interfaces for coupling to two or more video display devices, with potentially different formats and through potentially different interfaces such as component video, S-video HDMI, RF video jack or other video interface connection. Device interface 212 can include a removable memory device such as a memory card, writeable disk drive, and/or a wireless or wired communication link such as a wireless local area network interface, a wireless personal area network interface, an Ethernet port, a parallel port, a serial port, a small computer systems interface port, a IEEE 1394 compliant interface, and a universal serial bus interface or other connection.

While a particular architecture is described above, other architectures including alternative bus architectures, and architectures where the functionality of bus 220 is replaced by one or more direct connections or links, can likewise be implemented.

FIG. 6 presents a pictorial representation of a screen display 250 in accordance with an embodiment of the present invention. In particular a screen display is presented as part of a user interface generated by set-top box 10 for display on display device 62 or other display device. This interactive screen can be navigated and selections can be made by the user through the use of the remote control device 216. A set-up menu is presented that allows a user to enter or select index data pertaining to a particular instance of media content 52 to be protected by the distributed DRM service. As shown in this example, the user has entered the type of data/file format, the type of protection along with a 96 bit digital watermark, protection key information, an indication to track transfers of the media content 52 and to bill allowable transfers, if possible at 99-cents each. In addition, the user has elected to stop non-billable transfers without matching protection key data appended to the transfer.

Figure 7:
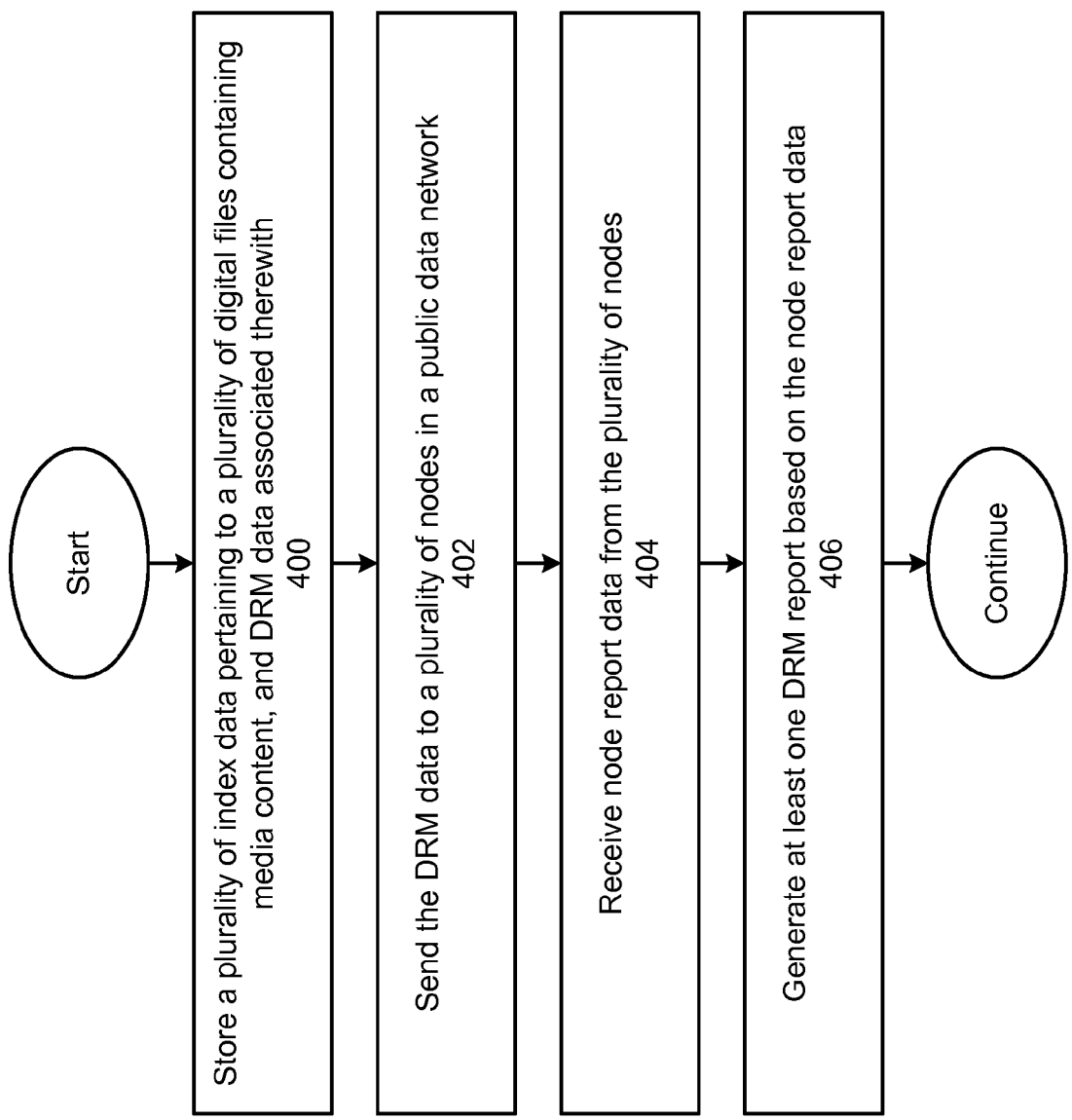
FIG. 7 presents a flowchart representation of a method in accordance with an embodiment of the present invention.

FIG. 7 presents a flowchart representation of a method in accordance with an embodiment of the present invention. In particular, a method is presented for use in conjunction with one or more of the features and functions described in association with FIGS. 1-6. In step 400, a plurality of index data are stored pertaining to a plurality of digital files containing media content, and digital rights management (DRM) data associated therewith. In step 402, the DRM data is sent to a plurality of nodes in the public data network. In step 404, node report data is received from the plurality of nodes. In step 406, at least one DRM report is generated based on the node report data.

In an embodiment of the present invention, the DRM data includes a DRM identifier corresponding to each of the plurality of digital files. The DRM identifier can includes a digital watermark, digital signature or other identification data. The DRM report can include event data pertaining to instances where at least one of the plurality of digital files was received at least one of the plurality of nodes. The billing data can indicate amounts billed for passage of at least one of the plurality of digital files through at least one of the plurality of nodes. The DRM report can include stopped-transaction data pertaining to the transmission of at least one of the plurality of digital files stopped by at least one of the plurality of nodes.

Figure 8:
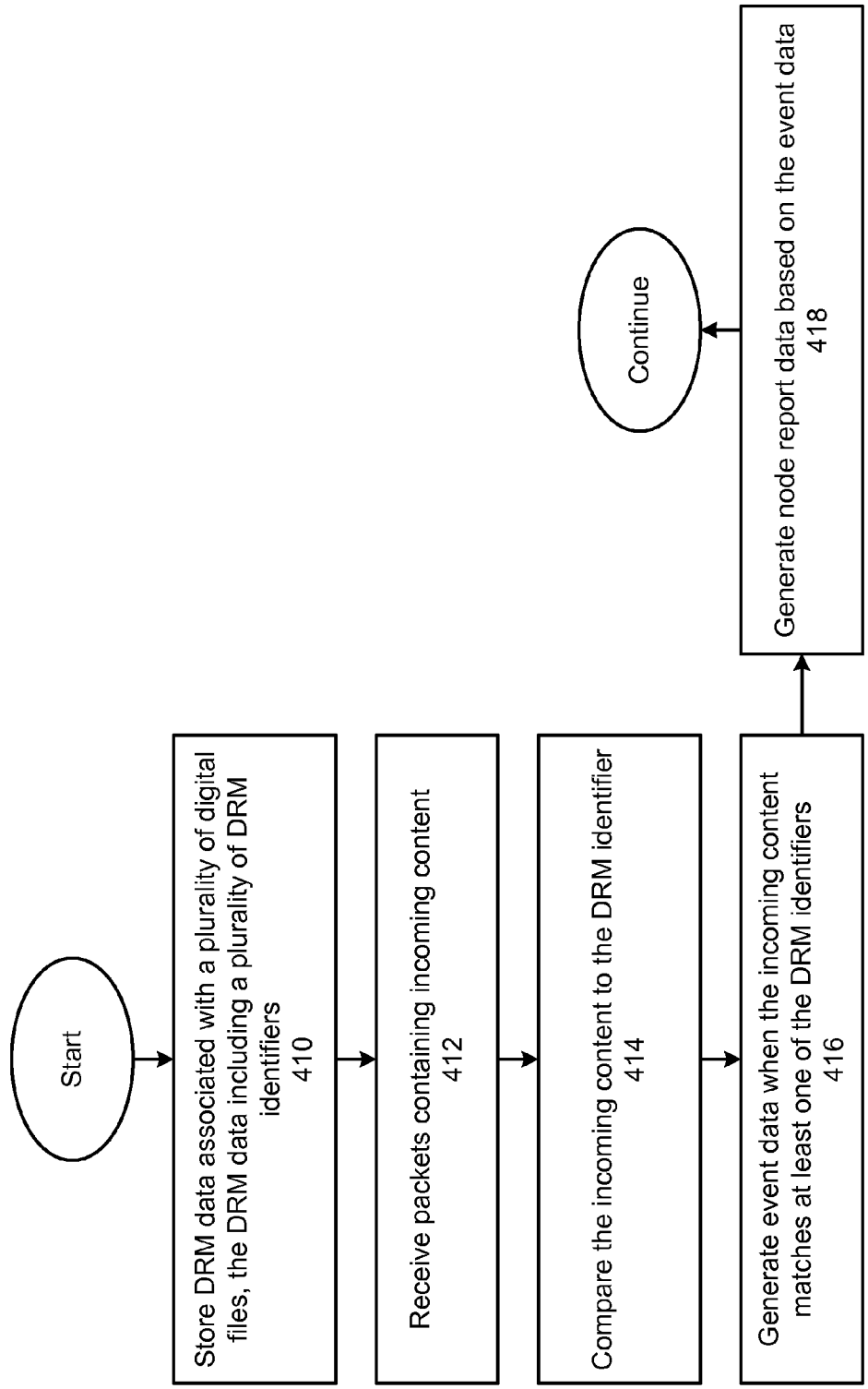
FIG. 8 presents a flowchart representation of a method in accordance with an embodiment of the present invention.

FIG. 8 presents a flowchart representation of a method in accordance with an embodiment of the present invention. In particular, a method is presented for use in conjunction with one or more of the features and functions described in association with FIGS. 1-7. In step 410, digital rights management (DRM) data associated with a plurality of digital files is stored, the DRM data including a plurality of DRM identifiers. In step 412, packets are received containing incoming content. In step 414, the incoming content is compared to the DRM identifier. In step 416, event data is generated when the incoming content matches at least one of the DRM identifiers. In step 418, node report data is generated based on the event data.

In an embodiment of the present invention, at least one of the plurality of DRM identifiers includes a digital watermark. The event data can include at least one of one of, a originator of the incoming content and a destination of the incoming content.

FIG. 9 presents a flowchart representation of a method in accordance with an embodiment of the present invention. In particular, a method is presented for use in conjunction with one or more of the features and functions described in association with FIGS. 7 and 8. In step 414, the incoming content is compared to the DRM identifier. If the incoming intent does not match the DRM identifier in decision block 420, the transmission is passed as shown in step 428. If a match is found, the method proceeds to decision block 422 to determine if a received key matches the protection key. If so, the transmission is passed as shown in step 428. If not, the method proceeds to decision block 424 to determine if a billing indicator indicates billing is allowed, such as when a user specifies that billing is allowed and if valid billing information is available. If so, a billing record is generated as shown in step 430 and the transmission is passed as shown in step 428. If not, the transmission is halted as shown in step 426.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing distributed digital rights management system that can include devices such as a home gateway device, set-top box, DRM host module, DRM node module and/or other device for monitoring and reporting on protected media content that passes through a data network. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An apparatus for use in a node of a public data network comprising:
    a node data device that stores digital rights management (DRM) data associated with a plurality of digital files, the DRM data including a plurality of DRM identifiers each associated with a corresponding one of the plurality of digital files, a report indicator associated with each of the plurality of DRM identifiers that indicates whether a report should be generated and a transfer indicator associated with each of the plurality of DRM identifiers, indicating whether transfer of the corresponding one of the plurality of digital files is authorized by a rights-holder of the corresponding one of the plurality of digital files;
    a packet monitoring device, coupled to the node data device, that receives the DRM data from the node data device, that receives packets containing incoming content and compares the incoming content to the plurality of DRM identifiers, and that generates event data when the incoming content matches at least one of the DRM identifiers and when the report indicator associated with the at least one of the DRM identifiers indicates that the report should be generated, that evaluates the transfer indicator associated with the at least one of the plurality of DRM identifiers, and that passes transmission of the corresponding one of the plurality of digital files when the transfer indicator indicates that the transfer is authorized; and
    a node reporting device, coupled to the packet monitoring device, that receives the event data, and that generates node report data based on the event data.

2. The apparatus of claim 1 wherein at least one of the plurality of DRM identifiers includes a digital watermark.

3. The apparatus of claim 1 wherein the event data includes at least one of one of, an originator of the incoming content and a destination of the incoming content.

4. The apparatus of claim 1 wherein the packet monitoring device halts transmission of the incoming content when the transfer indicator indicates that transfer is not authorized.

5. The apparatus of claim 1 wherein the DRM data includes a protection key associated with the at least one of the plurality of DRM identifiers, and wherein the packet monitoring device passes transmission of the incoming content when the incoming content matches at least one of the DRM identifiers, but also the protection key matches a received key from the incoming content.

6. The apparatus of claim 1 wherein the event data includes billing data.

7. A method for use in a node of a public data network, the method comprising:
    storing digital rights management (DRM) data associated with a plurality of digital files, the DRM data including a plurality of DRM identifiers each corresponding to one of the plurality of digital files, a report indicator associated with each of the plurality of DRM identifiers that indicates whether a report should be generated and a transfer indicator associated with each of the plurality of DRM identifiers, indicating whether transfer of the corresponding one of the plurality of digital files is authorized by a rights-holder of the corresponding one of the plurality of digital files;
    receiving packets containing incoming content;

comparing the incoming content to the plurality of DRM identifiers;

generating event data when the incoming content matches at least one of the plurality of DRM identifiers and when the report indicator associated with the at least one of the DRM identifiers indicates that the report should be generated, the event data indicating the corresponding one of the plurality of digital files;

evaluating the transfer indicator associated with the at least one of the plurality of the DRM identifiers;

passing transmission of the corresponding one of the plurality of digital files when the transfer indicator indicates that the transfer of the corresponding one of the plurality of digital files is authorized; and generating node report data based on the event data.

8. The method of claim 7 wherein at least one of the plurality of DRM identifiers includes a digital watermark.

9. The method of claim 7 wherein the event data includes at least one of one of, a originator of the incoming content and a destination of the incoming content.

10. The method of claim 7 further comprising:

halting transmission of the incoming content when the transfer indicator indicates that the transfer of the corresponding is not authorized.

11. The method of claim 7 wherein the DRM data includes a protection key associated with the at least one of the plurality of DRM identifiers, and wherein the method further comprises:

passing transmission of the incoming content when the incoming content matches at least one of the DRM identifiers, but also the protection key matches a received key from the incoming content.

12. The method of claim 7 wherein the event data includes billing data.

* * * * *